(12) United States Patent
Matthews et al.

(10) Patent No.: US 8,782,289 B2
(45) Date of Patent: Jul. 15, 2014

(54) PRESENTING MULTI-FUNCTION DEVICES BEHIND A SWITCH HIERARCHY AS A SINGLE FUNCTION DEVICE

(75) Inventors: David L. Matthews, Cypress, TX (US); Hubert E. Brinkmann, Spring, TX (US); James Xuan Dinh, Austin, TX (US); Dwight D. Riley, Houston, TX (US); Paul V. Brownell, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 38 days.

(21) Appl. No.: 12/996,996

(22) PCT Filed: Jun. 10, 2008

(86) PCT No.: PCT/US2008/066442
§ 371 (c)(1),
(2), (4) Date: Dec. 9, 2010

(87) PCT Pub. No.: WO2009/151447
PCT Pub. Date: Dec. 17, 2009

(65) Prior Publication Data
US 2011/0082949 A1    Apr. 7, 2011

(51) Int. Cl.
*G06F 3/00*      (2006.01)
*G06F 13/00*     (2006.01)
*H04L 12/28*     (2006.01)

(52) U.S. Cl.
CPC .................................... *H04L 12/28* (2013.01)
USPC ......... 710/1; 710/6; 710/11; 710/30; 710/100

(58) Field of Classification Search
USPC .......... 710/1, 300, 301, 305, 8, 6, 11, 30, 100
See application file for complete search history.

(56) References Cited

U.S. PATENT DOCUMENTS

| 6,175,918 | B1 | 1/2001 | Shimizu |
| 6,529,966 | B1 * | 3/2003 | Willman et al. ................ 710/10 |
| 6,772,252 | B1 * | 8/2004 | Eichler et al. ................ 710/104 |
| 7,110,413 | B2 * | 9/2006 | Riley ............................ 370/401 |
| 7,310,332 | B2 * | 12/2007 | Kadambi et al. ............. 370/360 |
| 7,373,443 | B2 * | 5/2008 | Seto .............................. 710/100 |
| 7,694,028 | B2 * | 4/2010 | Kasamatsu ....................... 710/8 |
| 2002/0178316 | A1 * | 11/2002 | Schmisseur et al. .......... 710/305 |
| 2005/0076164 | A1 * | 4/2005 | Malalur .......................... 710/22 |
| 2005/0245138 | A1 * | 11/2005 | Fischer et al. ................ 439/638 |
| 2007/0233928 | A1 * | 10/2007 | Gough ......................... 710/301 |
| 2008/0294923 | A1 * | 11/2008 | Barake et al. ................ 713/330 |
| 2009/0222610 | A1 * | 9/2009 | Yamazaki et al. ............ 710/308 |

FOREIGN PATENT DOCUMENTS

KR    2002/0022263    3/2002

OTHER PUBLICATIONS

International Search Report and Written Opinion, dated Jan. 21, 2009, 11 pages.

* cited by examiner

*Primary Examiner* — Idriss N Alrobaye
*Assistant Examiner* — Getente A Yimer (57) ABSTRACT

In one embodiment, a computer system, comprises at least one host node, at least one input/output node coupled to the host node, at least one multi-function device coupled to the input/output node via a switch, and a middle manager processor comprising logic to block an enumeration process in a host node for the multi-function devices behind the switch hierarchy, initiate an enumeration process for the multi-function devices in a manager processor separate from the host node, store a routing table for the switch hierarchy in a memory module coupled to the manager processor, and allocate, in the manager processor, endpoint device resources to the host node.

17 Claims, 5 Drawing Sheets

PRESENTING MULTI-FUNCTION DEVICES BEHIND A SWITCH HIERARCHY AS A SINGLE FUNCTION DEVICE

BACKGROUND

Computing networks may be populated with servers and client computers. Servers are generally more powerful computers that provide common functions such as file sharing and Internet access to the client computers. Client computers may be fully functional computers, each having a processor, hard drive, CD ROM drive, floppy drive and system memory.

Recently, thin client computing devices have become been adopted by IT organizations. Compared to fully functional client computers, thin clients may have only a relatively small amount of system memory and a relatively slow processor. Further, many thin clients lack hard drives, CD ROM drives or floppy drives. Thin clients may contain their own micro operating system or may be connected to a network to boot an operating system or load application programs such as word processors or Internet browsers.

Thin clients provide several advantages over fully functional client computers. Because thin clients have fewer moving parts, they are may be more reliable than their fully functional client computers. For example, many thin clients do not have their own hard drive. Because the hard drive is one of the most likely computer components to fail, the lack of a hard drive accounts for a significant increase in the reliability of a thin client computer compared to a fully functional client computer with its own hard drive.

The high reliability of thin clients makes them potentially desirable for use in a networked environment. Network maintenance costs are a significant expense in large network environments and companies and other organizations spend a large amount of resources to reduce those costs. Thin clients reduce networking costs and increase reliability by accessing data and applications stored on servers and other network resources rather than storing applications and data on a locally installed hard drive.

In a typical thin client networked environment, thin clients are connected over a network to a centralized server. The thin client computer communicates with the centralized server via a multi-user terminal server application program. The centralized server is responsible for providing a virtualized operating system for the thin clients that are connected to it. Additionally, the centralized server may supply application programs such as, e.g., word processing or Internet browsing to the thin clients as needed. A user's data such as, e.g., document files, spreadsheets and Internet favorites, may be stored on the centralized server or on a network storage device. Thus, when a thin client breaks, it may be easily removed and replaced without the need to restore the user's programs and data such as with a traditional fully functional client computer.

Blade servers are a recent development in the field of network computing. Blade servers are dense, low power blade computers that are designed to provide a high level of computing power in a relatively small space. Blade computers may employ low power components such a low power processors and hard drives in a relatively small package or form factor. In some applications hundreds of blade computers may be mounted in a single server rack.

DETAILED DESCRIPTION

Described herein are exemplary systems and methods for presenting multi-function devices behind a switch hierarchy as single function devices. The embodiments described herein are presented in the context of a blade server in which computer nodes, also referred to as host nodes, are coupled to input/output (I/O) nodes via point-to-point communication protocol such as, for example, a PCI-Express switching device. The methods described herein may be embodied as logic instructions on a computer-readable medium. When executed on one or more processor(s), the logic instructions cause the processor(s) to be programmed as a special-purpose machine that implements the described methods. The processor(s), when configured by the logic instructions to execute the methods recited herein, constitutes structure for performing the described methods.

Figure 1:
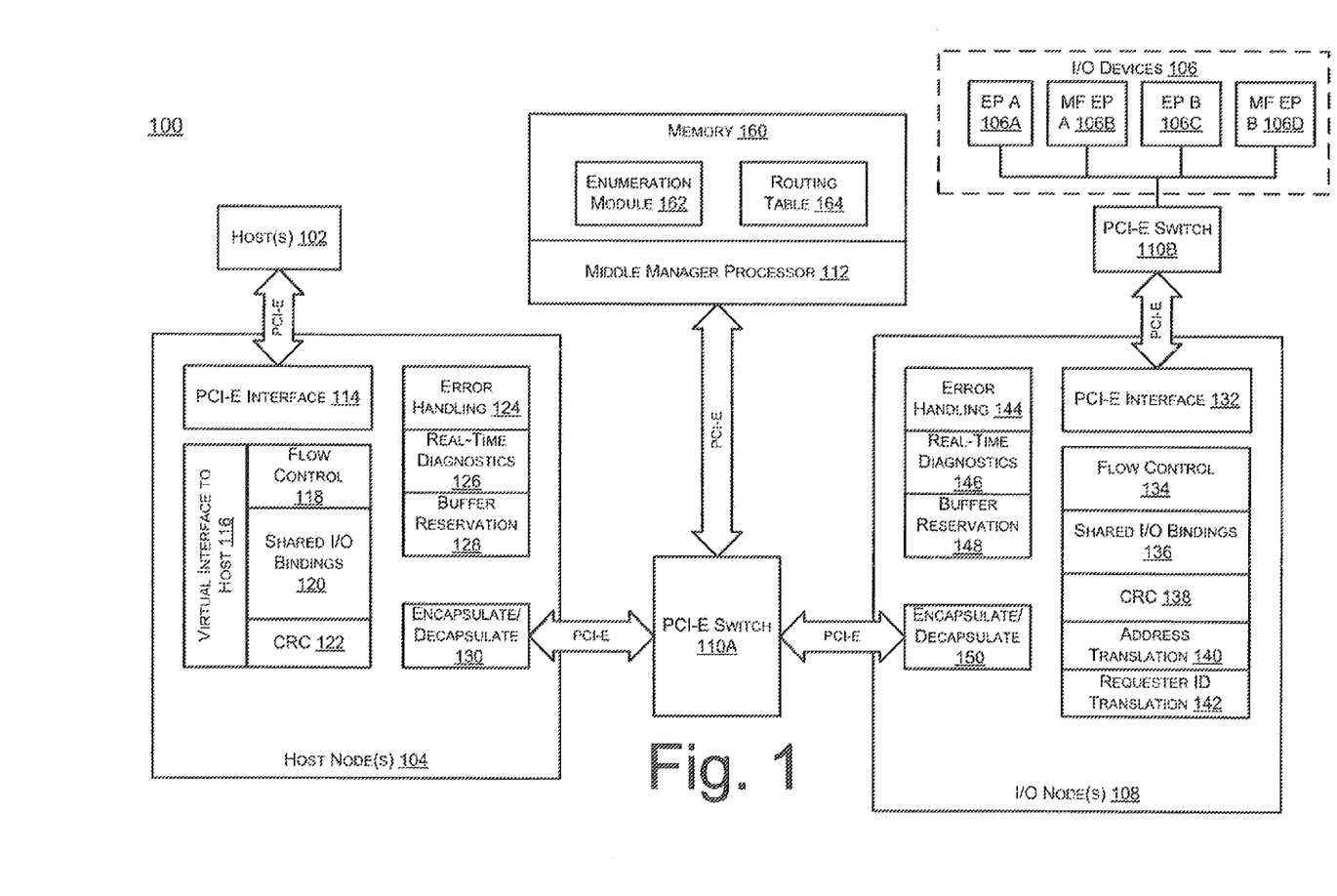
FIG. 1 is a schematic illustration of a blade server system architecture, according to embodiments.

FIG. 1 is a schematic illustration of a blade server system architecture, according to embodiments. Referring to FIG. 1, a blade server system 100 is shown. The system 100 includes at least a host device 102 with a host node 104 coupled to an I/O node 108 via a Peripheral Component Interconnect Express ("PCI-E") fabric, where the fabric connects the devices and nodes to a PCI-E switch 110A. In various embodiments, the illustrative host 102 may represent a plurality of hosts and the illustrative I/O node 108 represents a plurality of I/O nodes.

The I/O node 108 is coupled to one or more I/O devices 106 via a PCI switch 110B. In some embodiments the I/O devices 106 may comprise a storage device, a network interface controller, or other type of I/O device. I/O devices 106 may be implemented as a single-function PCI device, which has a single PCI endpoint, or as a multi-function PCI device which has multiple endpoints. In the embodiment depicted in FIG. 1, the I/O devices comprise a single-endpoint device 106A, a multifunction endpoint device 106B, a single-endpoint device 106C, and a multifunction endpoint device 106D.

The system 100 is managed by the middle manager processor 112, also referred to as the "manager processor" 112. The middle manager processor 112 may comprise a dedicated subsystem or be a node that is operable to take control of the remainder of the system. The middle manager processor 112 initializes the I/O devices 106 by applying configuration settings in the typical fashion, but accesses the system at the "middle," facilitated by PCI-E switch 110A. The middle manager processor 112 then assigns, or binds, particular I/O functions to a specific host node or leaves a given function unassigned. In doing so, the middle manager processor 112 prevents host nodes that are not bound to a specific I/O device and function from "discovering" or "seeing" the device during enumeration, as will be described further below. The bindings, or assignments of functions, thus steer signals for carrying out functions to the appropriate host node. Interrupts, and other host specific interface signals, may be assigned or bound to specific hosts based on values programmed in a block of logic to assist in proper steering of the signals.

The host node 104 includes a PCI-E Interface 114 that couples the host node 104 to the host 102, a virtual interface module 116 to the host, End-to-End flow control module 118 that monitors data packet flow across the PCI-E fabric, and shared I/O bindings 120 (i.e., specific functions) that stores a map of each function of the I/O devices 106 to a specific host. The host node 104 also includes end-to-end Cyclic Redundancy Code 122 ("CRC") module for error correction. The host node 104 also includes error handling module 124 that generates flags upon detection of an error, real-time diagnostics module 126 for detecting errors, and a Flow Control Buffer Reservation module 128 that stores the credits allocated for traffic across the PCI-E fabric. The host node 104 also includes an encapsulator/decapsulator 130 that processes packets traversing the PCI-E fabric to the host node 104.

The I/O node 108 includes a PCI-E Interface 132 that couples the I/O node 108 to the I/O device 106, End-to-End flow control module 134 that monitors data packet flow across the PCI-E fabric, and shared I/O bindings 136 (i.e., specific functions) that stores a map of each function of the I/O devices 106 to a specific host. The I/O node 108 also includes end-to-end Cyclic Redundancy Code module 138 for error correction. The I/O node 108 also includes an address translation map 140 that stores modified configuration register values for each value in actual configuration registers, such that a modified configuration exists for each host in the system. The modified configuration may consist of values that are simply substituted for the configuration read from the actual registers, or a mask that applies a logical operation, such as "AND," "OR," or exclusive OR "XOR") with a mask value to modify the values read from the actual registers. The I/O node 108 also includes a requester ID translation unit 142 that provides, based on which host requests the configuration register data values, the modified value identified for that particular host in the address translation 140. The I/O node 108 also includes error handling module 144 that generates flags upon detection of an error, real-time diagnostics 146 for detecting errors, a Flow Control Buffer Reservation module 148 that stores the credits allocated for traffic across the PCI-E fabric. The I/O node 108 also includes an encapsulator/decapsulator module 150 that processes packets traversing the PCI-E fabric to the I/O node 108.

In some embodiments, system 100 is configured to enable the middle manager processor 112 to present the I/O devices 106 behind the PCI switch 110B as single-function devices, even if the devices are multi-function devices. In this regard, middle manager processor 112 is coupled to a memory module 160, which in turn comprises an enumeration module 162 and a routing table 164. Operations implemented by the middle manager processor 112 are described in greater-detail with reference to FIGS. 2 and 3.

Figure 2A:
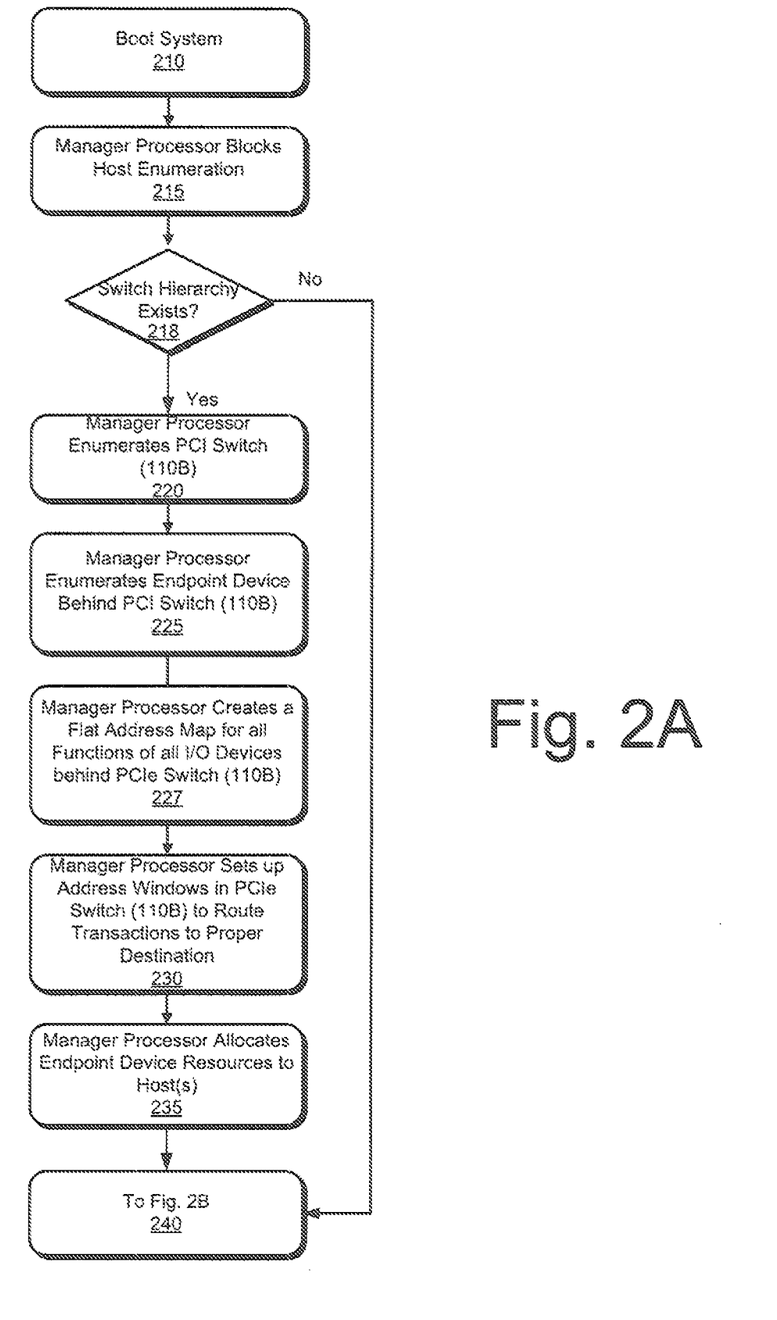
FIGS. 2A, 2B, and 3 are flowcharts illustrating operations in one embodiment of a method present the devices behind the PCI-Express switch as single-function devices.
Figure 2B:
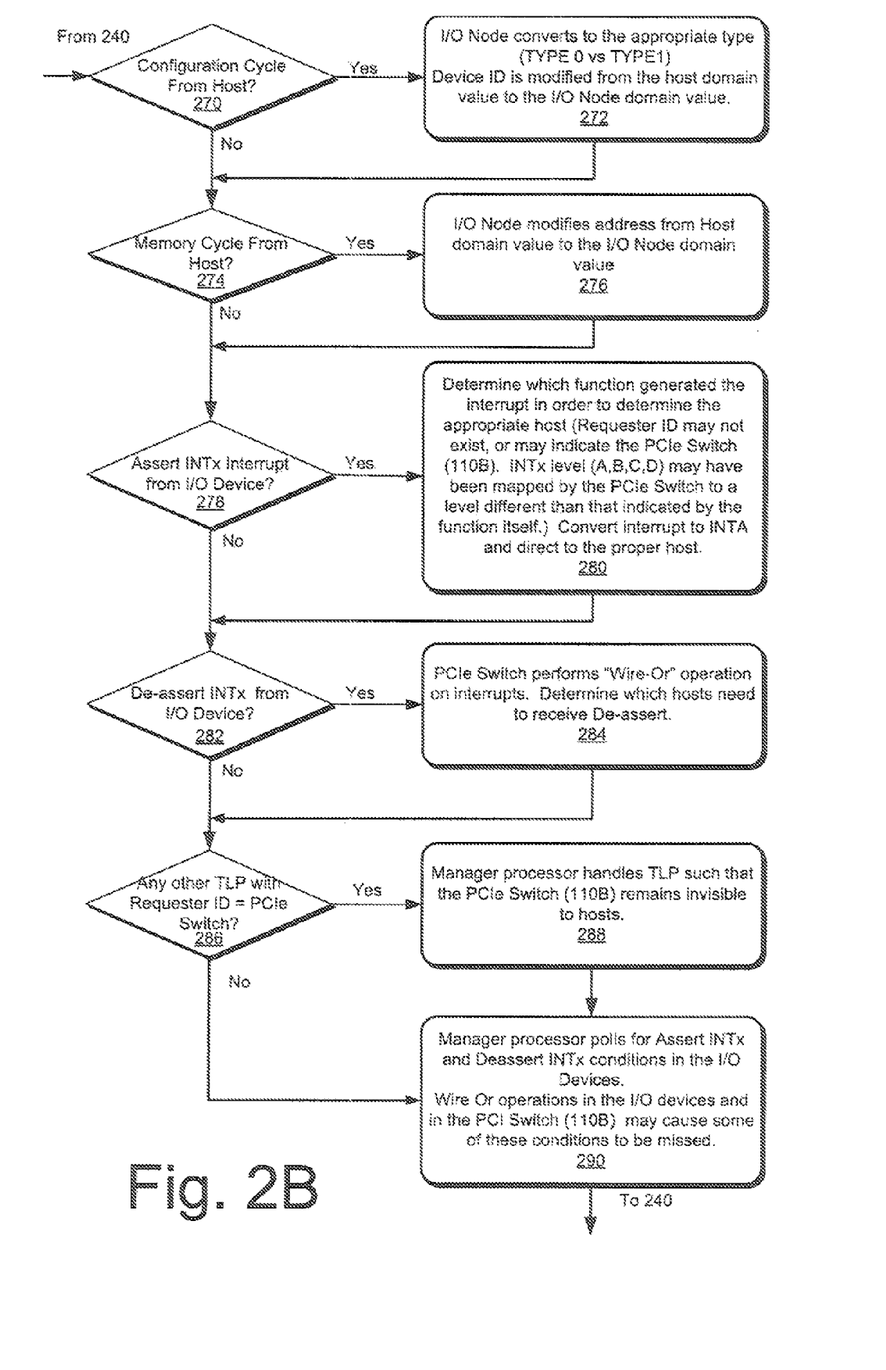
Figure 3:
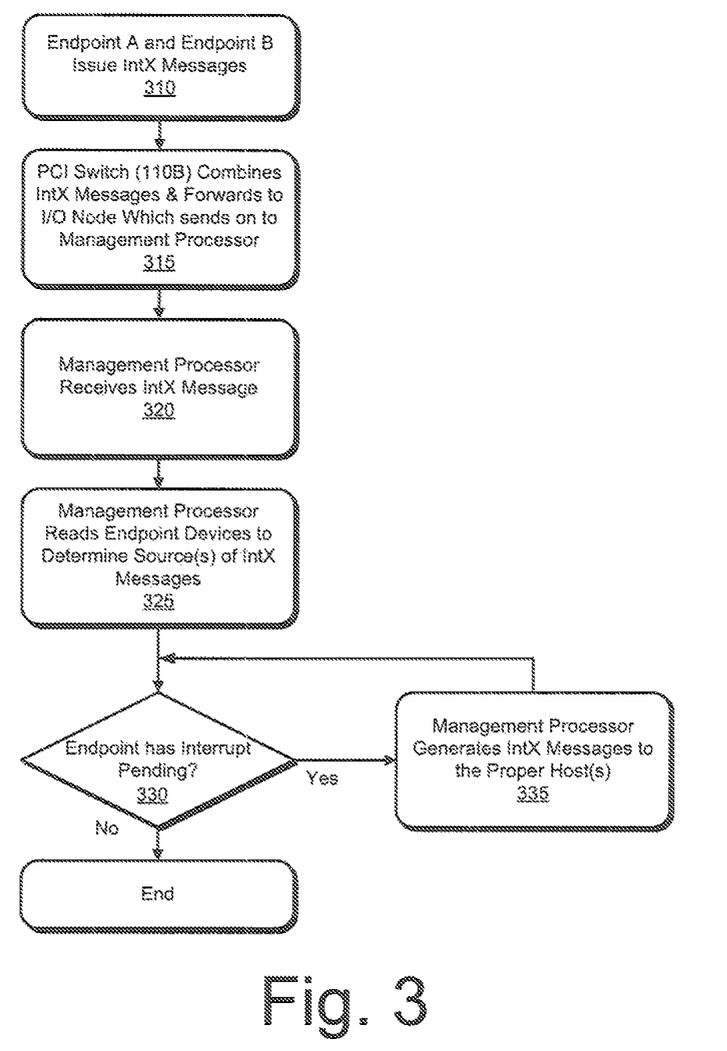

FIGS. 2A, 2B, and 3 are flowcharts illustrating operations in one embodiment of a method to present the devices behind the PCI-Express switch as single-function devices. In some embodiments, the operations depicted in FIGS. 2A, 2B, and 3 may be implemented as logic instructions stored in a computer-readable storage medium and executed on a processor.

In some embodiments, the operations depicted in FIG. 2A may be implemented by the enumeration module 162. Referring first to FIG. 2A, at operation 210 the system is booted. At operation 215 the manager processor 112 blocks host enumeration of I/O devices 106. If, at operation 218, a switch hierarchy does not exist, then control passes to operation 240, which directs control to the runtime operations depicted in FIG. 2B. By contrast, if at operation 218 a switch hierarchy exists, then control passes to operation 220. At operation 220 the manager processor 112 enumerates the PCI switch 110B, and at operation 225 the manager processor 112 enumerates the PCI endpoint devices behind the PCI switch 110B. For example, the manager processor 112 enumerates separately each endpoint of a multifunction PCI device.

At operation 227 the manager processor creates a flat address map for all functions of all input/output (I/O) devices behind PCIe switch 110B. At operation 230 the manager processor 112 sets up address windows in the PCIe switch 110B to route transactions to the proper destination. At operation 235 the manager processor 112 allocates endpoint device resources to the hosts. Control then passes to operation 240, which directs control to the runtime operations depicted in FIG. 2B.

FIG. 2B is a flowchart illustrating operations in an embodiment of a method to convert a configuration cycle. Referring to FIG. 2B, if, at operation 270, there is a configuration cycle from a host, then control passes to operation 272. At operation 272, the input/output (I/O) node 108 converts the configuration cycle to the appropriate type (i.e., either TYPE 0 or TYPE 1). Further, the device ID is modified from the host domain value to the I/O domain value. Control then passes to operation 274.

If, at operation 274, there is a memory cycle from a host, then control passes to operation 276 and the I/O node 108 modifies the memory address from the host domain value to the I/O Node domain value. Control then passes to operation 278.

If, at operation 278, there is an assert interrupt (INTx) from the input/output (I/O) device, then control passes to operation 280, where it is determined which function of an endpoint device generated the interrupt in order to determine the appropriate host. For example, a requester ID may not exist, or may indicate the PCIe switch 110B. The interrupt (INTx) level (A,B,C,D) may have been mapped by the PCIe switch 110B to a level different than that indicated by the function itself. Thus, the interrupt is converted to INTA and directed to the proper host. Control then passes to operation 282.

If, at operation 282, there is a de-assert interrupt (INTx) from the input/output (I/O) device, then control passes to operation 284, and the PCIe switch 110B performs a "Wire-Or" operation on interrupts to determine which hosts need to receive de-assert. Control then passes to operation 286.

If, at operation 286, there are any other transaction layer packets in which the requester ID corresponds to the PCIe switch 110B, then control passes to operation 288, and the Manager processor handles TLP such that the PCIe Switch remains invisible to hosts. Control then passes to operation 290 and the manager processor polls for Assert INTx and Deassert INTx conditions in the I/O Devices. Wire Or operations in the I/O devices and in the PCI Switch may cause some of these conditions to be missed. Control then passes back to operation 240 of FIG. 2A, and the PCIe transaction is sent to the endpoint device(s).

When the operations of FIGS. 2A and 2B are complete, the enumeration module 162 has constructed a routing table 164 that provides a mapping between a host 102 and an endpoint of an I/O device 106. Subsequently, the middle manager processor 112 implements operations to manage interrupt messages from the endpoints of I/O devices 106. Referring to FIG. 3, at operation 310 two endpoints (A and B) issue interrupt (IntX) messages. At operation 315 the PCI switch 110B combines the IntX messages and forwards the combined message to the management processor 112. At operation 320 the management processor 112 receives the combined IntX message, and at operation 325 the management processor 112 reads the endpoint devices in the message to determine the sources of the IntX message.

If, at operation 330, a particular endpoint has an interrupt pending, i.e., if the endpoint is identified in the IntX message from the PCI switch 110B, then control passes to operation 335 and the management processor 112 generates an IntX message to the proper host(s), i.e., the host(s) which are bound to the endpoint devices. Thus, operations 330-335 define a loop pursuant to which the manager processor 112 notifies hosts of interrupts from endpoint devices behind PCI switch 110B.

Figure 4:
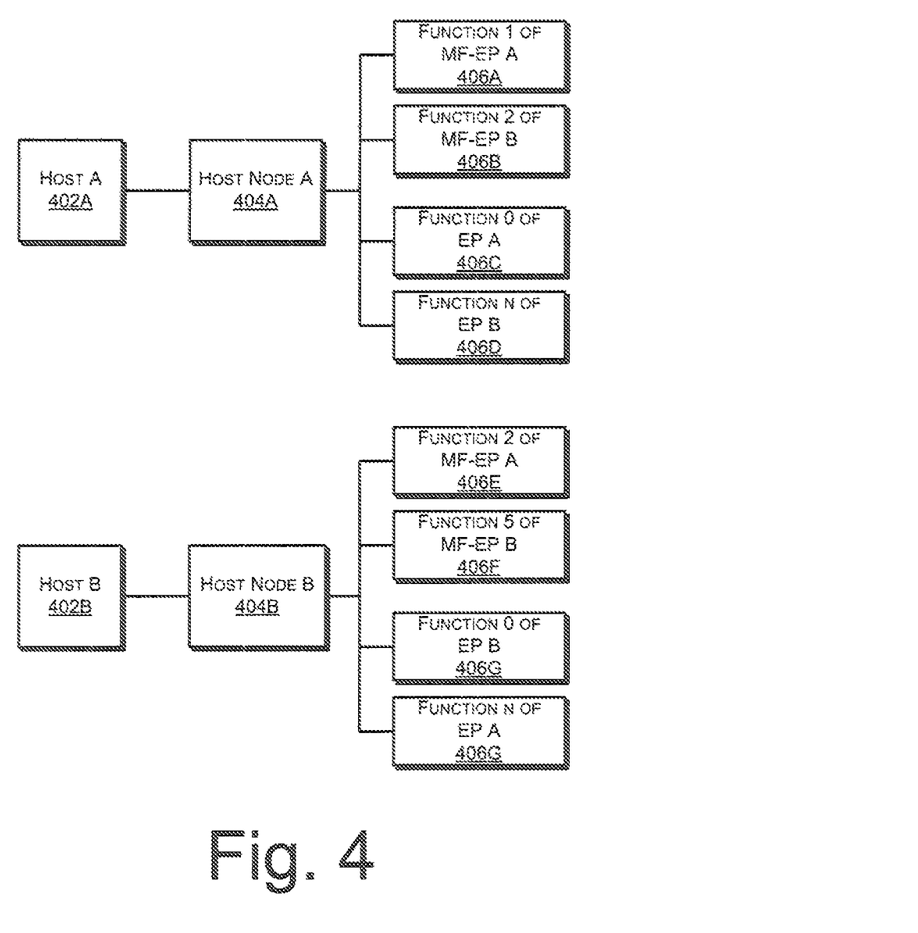
FIG. 4 is a schematic illustration of a blade server architecture, according to embodiments.

Thus, the operations of FIGS. 2 and 3 permit the manager processor 112 to present single function and multifunction devices behind the PCI switch 110B to hosts as single function endpoints. FIG. 4 is a schematic illustration of a blade server architecture, according to embodiments, as viewed from the perspective of a host. For example, from the perspective of host A 402A, it appears to be coupled to host node 404A and to endpoints 406A, 406B, 406C, and 406D, each of which may represent a discrete endpoint device or one function of a multifunction device. Similarly, from the perspective of host B 402B, it appears to be coupled to host node 404B and to endpoints 406E, 406F, 406G, and 406H, each of which may represent a discrete endpoint device or one function of a multifunction device.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and embodiments are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and embodiments are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and embodiments are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one embodiment" or "an embodiment" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A method, comprising:
blocking a first enumeration process in a first host node for a multi-function device behind a switch;
blocking a second enumeration process in a second host node for the multi-function device behind the switch;
initiating a third enumeration process for the multi-function device in a manager processor separate from the first host node, the second host node and the switch, the third enumeration process causing a first function of the multi-function device to be presented to the first host node as a first single function device and a second function of the multi-function device to be presented to the second host node as a second single function device;
determining, at the manager processor, based on a message from the switch, that the first single function device generated a first interrupt and the second single function device generated a second interrupt;
configuring an input/output node to convert an incoming type 0 configuration cycle from the manager processor to a type 1 configuration cycle; and
generating, in response to the determination, at the manager processor, a third interrupt to the first host node and a fourth interrupt to the second host node based on a routing table stored in a memory module in communication with the manager processor, the routing table mapping the first single function device to the first host node and the second single function device to the second host node.

2. The method of claim 1, wherein the switch passes the type 1 configuration cycle to the multi-function device.

3. A computer system, comprising:
a first host node;
a second host node;
an input/output node communicatively coupled to the first host node and the second host node;
a multi-function device communicatively coupled to the input/output node behind a switch; and
a middle manager processor separate from the first host node, the second host node and the switch to:
block a first enumeration process in the first host node for the multi-function device;

block a second enumeration process in the second host node for the multi-function device;

initiate a third enumeration process for the multi-function device, the third enumeration process causing a first function of the multi-function device to be presented to the first host node as a first single function device and causing a second function of the multi-function device to be presented to the second host node as a second single function device;

configure the input/output node to convert a type 0 incoming configuration cycle from the middle manager processor to a type 1 configuration cycle;

determine, based on a message from the switch, that the first single function device generated a first interrupt and the second single function device generated a second interrupt; and generate, in response to the determination, a third interrupt to the first host node and a fourth interrupt to the second host node based on a routing table stored in a memory module in communication with the middle manager processor, the routing table mapping the first single function device to the first host node and the second single function device to the second host node.

4. The computer system of claim 3, wherein the switch passes the type 1 configuration cycle to the multi-function device.

5. A tangible machine readable storage non-transitory computer readable medium comprising machine computer readable instructions, which instructions, when executed, cause a machine computer to at least:

block a first enumeration process in a first host node for a multi-function device behind a switch;

block a second enumeration process in a second host node for the multi-function device behind the switch;

initiate a third enumeration process for the multi-function device, the third enumeration process causing a first function of the multi-function device to be presented to the first host node as a first single function device and a second function of the multi-function device to be presented to the second host node as a second single function device; configure an input/output node to convert an incoming type 0 configuration cycle to a type 1 configuration cycle;

determine, based on a message from the switch, whether the first single function device generated a first interrupt and the second single function device generated a second interrupt; and generate, in response to the determination, a third interrupt to the first host node and a fourth interrupt to the second host node based on a routing table stored in a memory module, the routing table mapping the first single function device to the first host node and the second single function device to the second host node.

6. The tangible machine readable non-transitory computer readable medium as defined in of claim 5, wherein the switch passes the type 1 configuration cycle to the multi-function device.

7. The tangible machine readable non-transitory computer readable medium as defined in of claim 5, further comprising instructions to cause the machine computer to handle transaction layer packets containing a requester ID corresponding to the switch.

8. The tangible machine readable non-transitory computer readable medium as defined in of claim 5, wherein the instructions further cause to machine computer to allocate endpoint device resources to the first host node and the second host node based on the routing table.

9. The method of claim 1, wherein the third interrupt is associated with the first interrupt and the fourth interrupt is associated with the second interrupt.

10. The method of claim 1 further comprising handling, at the manager processor, transaction layer packets that contain a requester ID corresponding to the switch.

11. The method of claim 1 further comprising causing the manager processor to allocate endpoint device resources to the first host node and the second host node based on the routing table.

12. The computer system of claim 3, wherein the third interrupt is associated with the first interrupt and the fourth interrupt is associated with the second interrupt.

13. The computer system of claim 3, wherein the middle manager processor is further to handle transaction layer packets containing a requester ID corresponding to the switch.

14. The computer system of claim 7, wherein the middle manager processor is further to allocate endpoint device resources to the first host node and the second host node based on the routing table.

15. The method as defined in of claim 1 further comprising:
determining whether a fifth interrupt received from at the middle manager from the switch contains a requester ID;
based on the determination, identifying which of the first single function device or the second single function device generated the interrupt; and
generating a fifth interrupt to the identified single function device.

16. The computer system as defined in of claim 3, wherein the middle manager processor is further to:
determine whether a fifth interrupt received from at the middle manager from the switch contains a requester ID;
based on the determination, identify which of the first single function device or the second single function device generated the interrupt; and
generate a fifth interrupt to the identified single function device.

17. The tangible machine readable storage non-transitory computer readable medium as defined in of claim 5, wherein the instructions are further to cause the machine computer to:
determine whether a fifth interrupt received from at the middle manager from the switch contains a requester ID;
based on the determination, identify which of the first single function device or the second single function device generated the interrupt; and
generate a fifth interrupt to the identified single function device.

* * * * *

UNITED STATES PATENT AND TRADEMARK OFFICE
CERTIFICATE OF CORRECTION

PATENT NO. : 8,782,289 B2
APPLICATION NO. : 12/996996
DATED : July 15, 2014
INVENTOR(S) : David L. Matthews et al.

Page 1 of 1

It is certified that error appears in the above-identified patent and that said Letters Patent is hereby corrected as shown below:

IN THE CLAIMS:

In column 7, line 28, in Claim 5, after "readable" delete "storage".

In column 7, line 56, in Claim 6, delete "in of" and insert -- in --, therefor.

In column 8, line 2, in Claim 7, delete "in of" and insert -- in --, therefor.

In column 8, line 7, in Claim 8, delete "in of" and insert -- in --, therefor.

In column 8, line 8, in Claim 8, delete "cause to" and insert -- cause the --, therefor.

In column 8, line 26, in Claim 14, delete "claim 7," and insert -- claim 3, --, therefor.

In column 8, line 30, in Claim 15, delete "in of" and insert -- in --, therefor.

In column 8, line 38, in Claim 16, delete "in of" and insert -- in --, therefor.

In column 8, line 47, in Claim 17, after "readable" delete "storage".

In column 8, line 48, in Claim 17, delete "in of" and insert -- in --, therefor.

Signed and Sealed this
Twenty-fifth Day of November, 2014

Michelle K. Lee
*Deputy Director of the United States Patent and Trademark Office*